US008761741B2

(12) United States Patent
Schmidt et al.

(10) Patent No.: US 8,761,741 B2
(45) Date of Patent: Jun. 24, 2014

(54) LOCATION-BASED ENABLING/DISABLING OF CALLER ID/CALLER ID BLOCKING FEATURES FOR MOBILE DEVICE

(75) Inventors: Kurt Schmidt, Chapel Hill, NC (US); L. Scott Bloebaum, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 767 days.

(21) Appl. No.: 12/271,427

(22) Filed: Nov. 14, 2008

(65) Prior Publication Data

US 2010/0124914 A1    May 20, 2010

(51) Int. Cl.
*H04M 3/42* (2006.01)
*H04W 24/00* (2009.01)

(52) U.S. Cl.
USPC ........................................ 455/415; 455/456.6

(58) Field of Classification Search
USPC ........... 455/69, 415, 419, 457.3, 456.4, 456.6
See application file for complete search history.

(56) References Cited

U.S. PATENT DOCUMENTS

| | | | | |
|---|---|---|---|---|
| 5,274,699 | A * | 12/1993 | Ranz ........................ | 379/142.09 |
| 6,701,144 | B2 * | 3/2004 | Kirbas et al. .................. | 455/417 |
| 7,194,273 | B2 * | 3/2007 | Vaudreuil .................. | 455/456.3 |
| 2004/0208304 | A1 * | 10/2004 | Miller ...................... | 379/210.02 |
| 2005/0070298 | A1 | 3/2005 | Caspi et al. | |
| 2005/0079879 | A1 | 4/2005 | Carlson et al. | |
| 2005/0272448 | A1 | 12/2005 | Tran et al. | |

FOREIGN PATENT DOCUMENTS

| | | |
|---|---|---|
| JP | 2000-050353 | 2/2000 |
| JP | 2002-016673 | 1/2002 |
| JP | 2005-184539 | 7/2005 |
| JP | 2008-167381 | 7/2008 |
| WO | WO 2004/077797 A2 | 9/2004 |

OTHER PUBLICATIONS

Sprint PCS / Nokia 3588i User's Guide, 2003, pp. 8-10.*
Mobiledia review of Nokia 3588i Phone (Sprint); www.mobiledia.com/prhones/nokia/3588i.html, Dec. 2003.*
International Search Report dated Aug. 14, 2009 issued in corresponding PCT application No. PCT/US2009/043576, 12 pages.
International Preliminary Report on Patentability dated Jan. 24, 2011 issued in corresponding PCT application No. PCT/US2009/043576, 7 pages.

* cited by examiner

*Primary Examiner* — Ariel Balaoing
*Assistant Examiner* — Larry Sterbane
(74) *Attorney, Agent, or Firm* — Snyder, Clark, Lesch & Chung, LLP

(57) ABSTRACT

A mobile device including a location module configured to determine a location of the mobile device, and a caller identification (ID) and/or caller ID blocking module configured to provide caller ID and/or caller ID blocking features by sending and/or receiving a signal with caller ID and/or caller ID blocking information. The caller identification and/or caller ID blocking module is configured to enable and disable the caller ID and/or caller ID blocking features based upon the location of the mobile device determined by the location module.

15 Claims, 3 Drawing Sheets

LOCATION-BASED ENABLING/DISABLING OF CALLER ID/CALLER ID BLOCKING FEATURES FOR MOBILE DEVICE

TECHNICAL FIELD

The present disclosure relates to mobile devices and, more particularly, to caller identification (or caller ID) and caller ID blocking features for the mobile device.

BACKGROUND

Lifestyles have become increasingly reliant on mobile communications. Wireless communication devices, such as cellular phones, laptop computers, pagers, personal communication systems (PCS), personal digital assistants (PDA), and the like, provide advantages of ubiquitous communication without geographic or time constraints. Such mobile devices are equipped with various components that allow a user to make a receive voice and/or video communications using a variety of different means of communication protocols, such as cellular telephone communication, voice over internet protocol (VoIP) communication, etc. Such communication protocols may also allow a call-receiving party to determine certain information about a call-initiating party (e.g., the telephone number, name, etc.) prior to answering of the call, so that the call-receiving party can determine whether or not to answer the call. Such features are typically referred to as caller ID features. In certain instances, it may be desirable to disable or block such caller ID features from allowing a call-receiving party to view such information even if the call-receiving party has caller ID, which is typically referred to as caller ID blocking. However, presently the options associated with the use and configuration of such features is very limited.

Accordingly, a need exists for new ways of using and configuring such caller ID and caller ID blocking features.

DISCLOSURE

The above described needs are fulfilled, at least in part, by providing an embodiment of a mobile device that, for example, advantageously includes a location module configured to determine a location of the mobile device, and a caller identification (ID) and/or caller ID blocking module configured to provide caller ID and/or caller ID blocking features by sending and/or receiving a signal with caller ID and/or caller ID blocking information, wherein the caller identification and/or caller ID blocking module is configured to enable and disable the caller ID and/or caller ID blocking features based upon the location of the mobile device determined by the location module.

An additional advantageous embodiment provides a method that includes providing a mobile device configured to receive an incoming communication including a signal with caller identification information, determining a location of the mobile device upon receipt of the signal, and enabling and/or disabling caller ID and/or caller ID blocking features of the mobile device based upon the determined location of the mobile device.

A further advantageous embodiment provides a method that includes providing a mobile device configured to initiate an outgoing communication including a signal with caller identification information, determining a location of the mobile device upon sending of the signal, and enabling and/or disabling caller ID and/or caller ID blocking features of the mobile device based upon the determined location of the mobile device.

Additional advantages of the present disclosure will become readily apparent to those skilled in this art from the following detailed description, wherein preferred embodiments of the disclosure is shown and described, simply by way of illustration of the best mode contemplated. As will be realized, the disclosure is capable of other and different embodiments, and its several details are capable of modifications in various obvious respects. Accordingly, the drawings and description are to be regarded as illustrative in nature, and not as restrictive.

DETAILED DESCRIPTION

Figure 1:
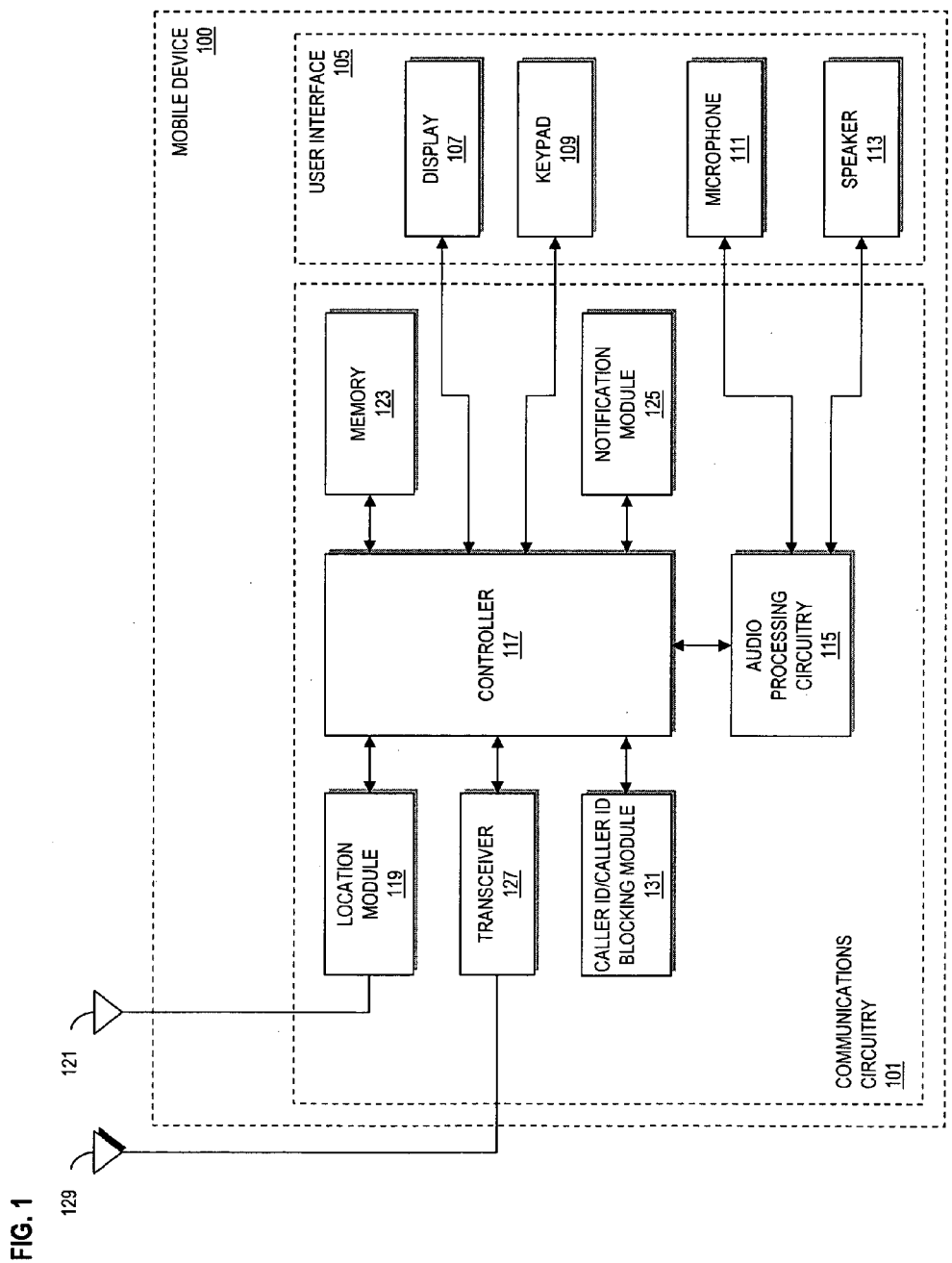
FIG. 1 is a block diagram of a mobile device, according to an exemplary embodiment.

Embodiments of the present disclosure will be described hereinafter with reference to the accompanying drawings. In the following description, the constituent elements having substantially the same function and arrangement are denoted by the same reference numerals, and repetitive descriptions will be made only when necessary.

The embodiments of the invention described below provide for the advantageous integration of location determination capability with other features or applications in a mobile device. More particularly, the embodiments provide for the utilization of location-based information to enable/disable caller ID and/or caller ID blocking functions for incoming/outgoing calls of a mobile device. This function advantageously provides a way in which to control the use of caller ID features based upon location-based restrictions on such features that are set by the user or a third party (e.g., government, service provider, a user's employer, etc.).

FIG. 1 is a block diagram of a mobile device 100, according to an exemplary embodiment. While the embodiment depicted in FIG. 1 is generally provided in the form of a wireless telephony device, the mobile device can be any wireless two-way communicator. For example, mobile device can be a portable laptop device, a cellular phone, a two-way trunked radio, a combination cellular phone and personal digital assistant (PDA), a smart phone, a cordless phone, a satellite phone, or any other suitable mobile device with telephony capabilities, such as a mobile computing device. Mobile device may also correspond to suitable portable objects, devices, or appliances including a transceiver, such as a wireless fidelity (WiFi) transceiver, a worldwide interoperability for microwave access (WiMAX) transceiver, and the like.

Mobile device 100 depicted in FIG. 1 includes communications circuitry 101, and user interface 105. User interface 105 includes display 107, keypad 109, microphone 111, and speaker 113. Display 107 provides a graphical interface that permits a user of mobile device 100 to view dialed digits, call status, menu options, and other service information. The graphical interface may include icons and menus, as well as other text and symbols. Keypad 109 includes an alphanumeric keypad and may represent other input controls, such as a joystick, button controls, touch panel, dials, etc. The user thus can construct user profiles, enter commands, initialize applications, input remote addresses, and select options from menu systems. Microphone 111 converts spoken utterances of a user into electronic audio signals, while speaker 113 converts audio signals into audible sounds.

Communications circuitry 101 includes audio processing circuitry 115, controller 117, location module 119 (such as GPS receiver) coupled to antenna 121, memory 123, notification module 125, transceiver 127 coupled to antenna 129, and a caller ID control module 131. Memory 123 may represent a hierarchy of memory, which may include both random access memory (RAM) and read-only memory (ROM). Computer program instructions, and corresponding data for operation can be stored in non-volatile memory, such as erasable programmable read-only memory (EPROM), electrically erasable programmable read-only memory (EEPROM), and/or flash memory. Memory 123 may be implemented as one or more discrete devices, stacked devices, or integrated with controller 117. Memory 123 may store information, such as one or more user profiles, one or more user defined policies, caller ID control policies, one or more contact lists, photos, videos, etc.

Controller 117 controls the operation of mobile device 100 according to programs and/or data stored to memory 123. Control functions may be implemented in a single controller or via multiple controllers. Suitable controllers may include, for example, both general purpose and special purpose controllers and digital signal processors. Controller 117 may interface with audio processing circuitry 115, which provides basic analog output signals to speaker 113 and receives analog audio inputs from microphone 111. Controller 117, as will be described in more detail below, is configured to execute a content tagging and sorting application stored to memory 123.

In this embodiment, the mobile device 100 includes a location module 119, which can be comprised of one or more location-determination technologies, including Global Positioning System (GPS), assisted GPS (A-GPS), or network-centric technologies by which the location is determined from measurements made on terrestrial communication signals (e.g., cellular or digital television signals) by the mobile device 100 or a network with which mobile device 100 communicates. The location module 119 embodying such technologies may be capable of being disabled by the user or in certain circumstances; however, preferably at least one of the location-determination technologies comprising location module 119 is enabled during normal use of the mobile device 100.

The position of mobile device 100 is monitored, for example, through GPS technologies that utilize a system of orbital satellites to determine positioning information. For example, a GPS receiver, such as location module 119, calculates its position by carefully timing the signals sent by the constellation of GPS satellites high above the Earth. Each satellite continually transmits messages containing the time the message was sent, a precise orbit for the satellite sending the message (the ephemeris), and the general system health and rough orbits of all GPS satellites (the almanac). These signals travel at the speed of light (which varies between vacuum and the atmosphere). The receiver uses the arrival time of each message to measure the distance to each satellite, from which it determines the position of the receiver (conceptually the intersection of spheres). The resulting coordinates are converted to more user-friendly forms such as latitude and longitude, or location on a map, then displayed to the user. Accordingly, the spatial position of the receiving antenna can be determined with great accuracy and convenience.

The mobile device 100 includes the caller ID control module 131 that is in communication with the controller 117. When an incoming call signal is received using transceiver 127 coupled to antenna 129, the caller ID control module 131 can determine whether caller ID information is present in the incoming call signal and, if so, then the caller ID control module 131 can send a command to the controller 117 to control the display 107 to provide the user with an appropriate message based on the information received. Also, when an outgoing call is initiated and sent using transceiver 127 coupled to antenna 129, caller ID control module 131 can determine whether caller ID information should be included in the outgoing signal. The manner in which incoming and outgoing calls are handled by the caller ID control module 131 can be configured either locally using the mobile device 100 or remotely by the user of mobile device 100, a service provider, or another third party. Furthermore, such settings can be stored in memory 123, after downloading in the case of remote configuration of the settings.

Figure 2:
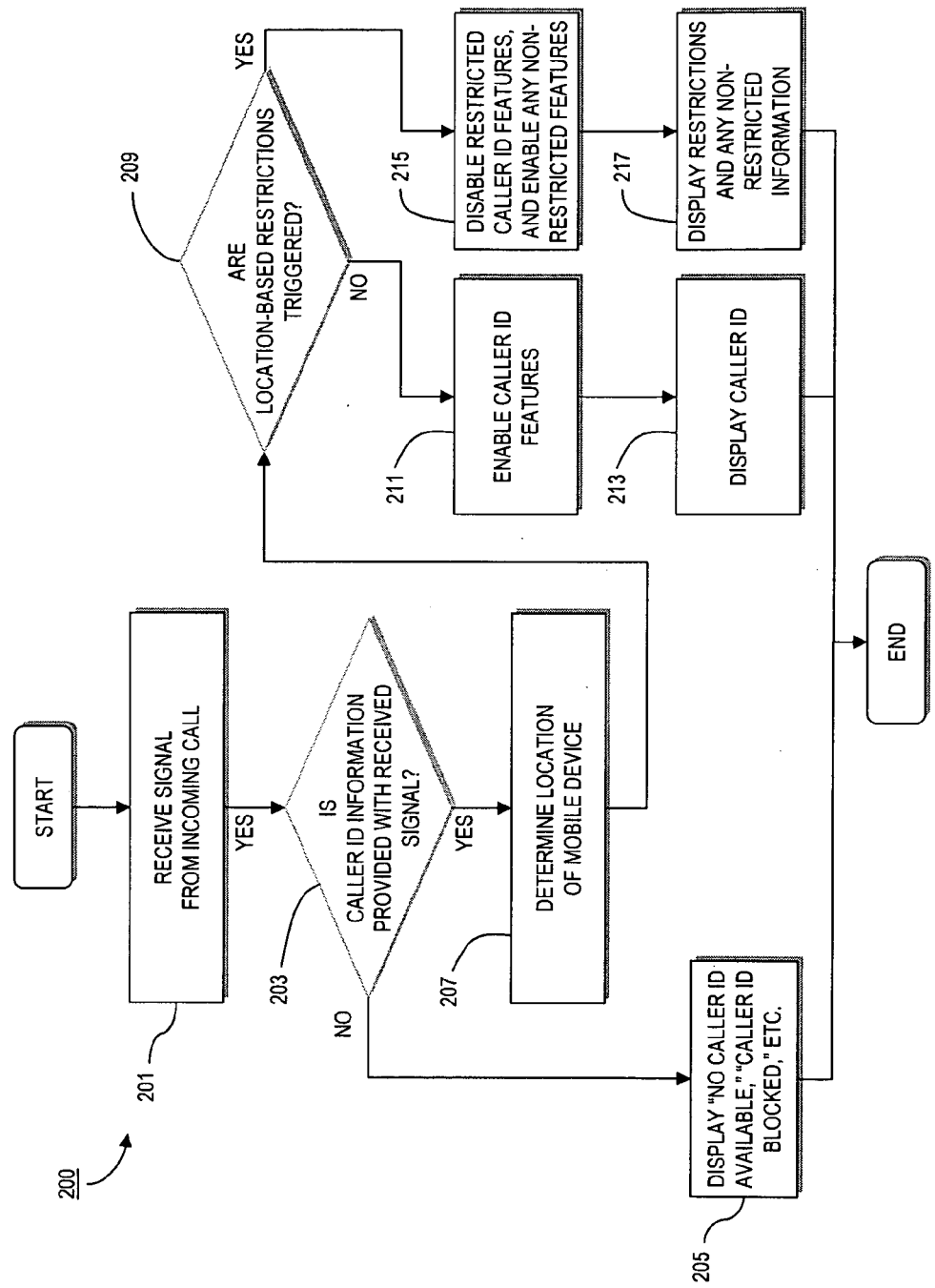
FIG. 2 is a flowchart of a process of enabling/disabling caller ID features using location-based restrictions for incoming communications, according to an exemplary embodiment.

FIG. 2 is a flowchart of a process 200 of enabling/disabling caller ID features using location-based restrictions for incoming communications, according to an exemplary embodiment. The process 200 begins with the receipt of a signal from an incoming call to the mobile device 100 in step 201. It should be noted that the process 200 set forth in FIG. 2 is performed immediately upon receipt of the incoming call signal, and presumably before the user answers the incoming call. Also, the particular order of the steps, such as steps 203 and 207/209, which are discussed in detail below, can be rearranged from the order depicted and yet still achieve the process contemplated herein. The embodiment of the process described herein is merely exemplary of the contemplated process.

In step 203 of the process 200 shown in FIG. 2, caller ID control module 131 will determine whether caller ID information for the calling party is provided with the signal received from the calling party's device. If caller ID information is not provided with the received signal (e.g., if the calling party does not have caller ID service, or if the calling party or a third party has blocked the caller ID at some stage of transmission/reception), then the display 107 will display a message such as "No Caller ID Available," "Caller ID Blocked," etc., as shown in step 205. If, however, caller ID information is provided with the received signal, then the process will proceed to step 207.

In step 207, the controller 117 uses the location module 119 to determine the geographic location of the mobile device 100 at that time. In step 209, caller ID control module 131 will determine, using the location of the mobile device and the predetermined restrictions stored in the memory 123, whether any location based restrictions on the use of the caller ID features have been triggered based on the location. For example, the user or a third party can put certain restrictions on the use of the caller ID features within a certain geographic area (e.g., a specific town, city, state, etc.; a radius around a geographic position such as a particular postal code; etc.). Thus, the use of the caller ID features can be restricted in certain areas or, conversely, can be restricted to be used only within certain areas. Also, the restrictions can allow certain caller ID features within a certain area, while permitting other caller ID features in an overlapping area. For example, in an area the use of a calling party's name and/or phone number may be permitted, while the use of a calling party's picture, description, etc. that may be otherwise available using "enriched" or "rich" caller ID features are prohibited in that area.

Thus, if in step 209 it is determined that no location-based restrictions are present and triggered (i.e., the current detected location does not fall within an area where any restrictions prohibiting use of caller ID features are present), then the caller ID control module 131 and controller 117 enable caller ID features in step 211 and then allow the display 107 to display the caller ID in an unrestricted manner in step 213. However, if in step 209 it is determined that location-based restrictions are present and are partially or fully triggered (i.e., the current detected location does fall within an area where restrictions prohibit the partial or complete use of caller ID features), then caller ID control module 131 and controller 117 disable restricted caller ID features and enable any non-restricted feature (if any) in step 215, and then allow the display 107 to display a message that indicates that restrictions on caller ID features are in effect and to display any non-restricted information in step 217. Thus, if the current location prohibits the use of the calling party's name or picture, but allows the use of the calling party's telephone number, then the telephone number can be displayed along with a message indicating that some caller ID features have been restricted.

Figure 3:
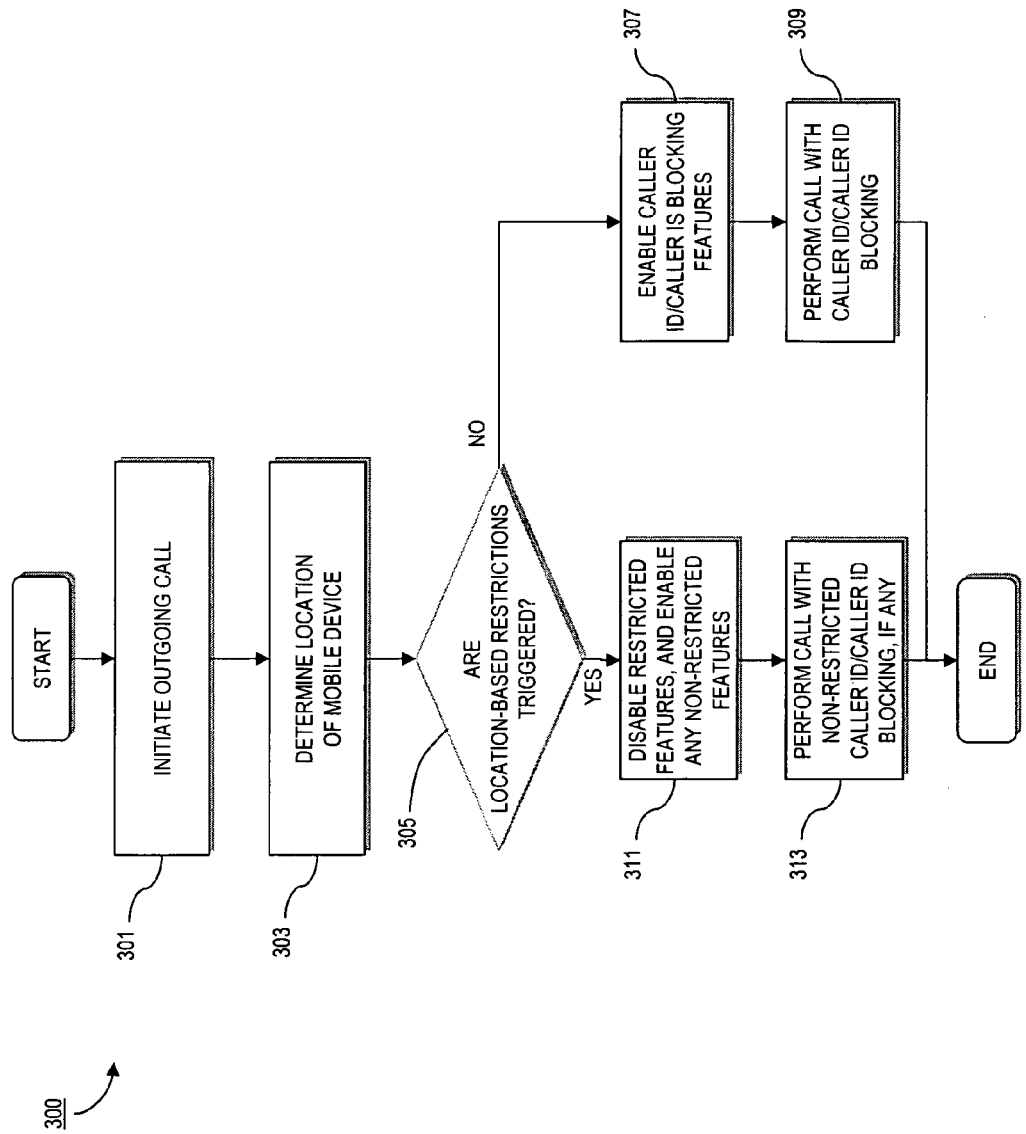
FIG. 3 is a flowchart of a process of enabling/disabling caller ID features using location-based restrictions for outgoing communications, according to an exemplary embodiment.

FIG. 3 is a flowchart of a process 300 of enabling/disabling caller ID features using location-based restrictions for outgoing communications, according to an exemplary embodiment. The process 300 begins with the initiation of an outgoing call using the mobile device 100 in step 301. It should be noted that the process 300 set forth in FIG. 3 is performed immediately upon initiation of the outgoing call, and presumably before the call signal is sent and/or received by the called party.

In step 303 of the process 300 shown in FIG. 3, the controller 117 uses the location module 119 to determine the geographic location of the mobile device 100 at that time. In step 305, caller ID control module 131 will determine, using the location of the mobile device and the predetermined restrictions stored in the memory 123, whether any location based restrictions on the use of the caller ID features have been triggered based on the location. For example, the user or a third party can put certain restrictions on the use of the caller ID features within a certain geographic area (e.g., a specific town, city, state, etc.; a radius around a particular postal code; etc.). Thus, the use of the caller ID features can be restricted in certain areas or, conversely, can be restricted to be used only within certain areas. Also, the restrictions may allow certain caller ID features within a certain area, while permitting other caller ID features in an overlapping area. For example, in an area the use of a calling party's name and/or phone number may be permitted, while the use of a calling party's picture, description, etc. that may be otherwise available using "enriched" or "rich" caller ID features are prohibited in that area.

Thus, if in step 305 it is determined that no location-based restrictions are present and triggered (i.e., the current detected location does not fall within an area where any restrictions prohibiting use of caller ID features are present), then the caller ID control module 131 enables the caller ID features in step 307 and then sends a signal to the controller 117, which provides such signal to be sent with the outgoing call such that the outgoing call is performed with caller ID information being provided with the call signal in an unrestricted manner in step 309. However, if in step 305 it is determined that location-based restrictions are present and are partially or completely triggered (i.e., the current detected location does fall within an area where restrictions prohibit the partial or complete use of caller ID features), then restricted features are disabled and any non-restricted features (if any) are enabled in step 311, and then the caller ID control module 131 and controller 117 provide that the outgoing call is performed without any restricted caller ID information being provided with the call signal, but with any non-restricted caller ID information being provided with the call signal in step 313.

If desired, in conjunction with the performance of steps 309 and/or 313, the caller ID control module 131 and the controller 117 can be used to display messages on the display 107 that indicate that such steps are being performed. For example, along with the performance of step 309, the display 107 can indicate that the caller ID features are enabled and in use. Also, along with the performance of step 313, the display 107 can indicate that the caller ID features are enabled, but partially or wholly restricted from use at the present location.

Thus, the embodiments described herein allow for the utilization of location determination capabilities with other features or applications in a mobile device. More particularly, the embodiments location information, and caller ID features to advantageously provide a mobile device that can utilize caller ID and/or caller ID blocking features in desired locations and prohibit the use thereof in locations where such features are not desired or allowed.

Mobile device users and/or third parties can define one or more particular geographic areas in which the use of caller ID features, which are otherwise available on the mobile device, should be limited to or excluded from use. For instance, the user or third party can determine that the use of caller ID features should be limited to a predefined radius around one or more particular postal addresses or one or more predetermined addresses, or limited to within a predetermined geographical area (e.g., town, city, state, etc.). Optionally, the user or third party can also choose certain caller ID control features that can be used in an area, while prohibiting the use of other caller ID control features in that area. Many different combinations of restrictions can be defined and utilized.

The parameters of such restrictions can be entered into the mobile device, either directly by the user, or via download from an Internet-based application server if done remotely by the user, a service provider, or another third party.

Typically, the mobile device user can have the location-determination capability of the mobile device enabled during normal use. When the mobile device attempts to use the caller ID features on the device, the application manager checks the restriction settings and current location to determine if the features can be enabled or utilized. If so, then the features are available for normal use. If not, the device may give the user a warning about the use restriction or may block the features.

It should be noted that the exemplary embodiments depicted and described herein set forth the preferred embodiments of the present disclosure, and are not meant to limit the scope of the claims hereto in any way. Numerous modifications and variations of the present disclosure are possible in light of the above teachings. It is therefore to be understood that, within the scope of the appended claims, the disclosed concepts may be practiced otherwise than as specifically described herein.

What is claimed is:

1. A mobile communication device comprising:
  a location module configured to determine a location of the mobile communication device;
  a caller identification (ID) control module configured to regulate whether caller ID data are provided in call signals, wherein the provision of caller ID data in call signals is restricted based upon the location of the mobile communication device as determined by the location module;
a memory configured to store caller ID restriction settings data that are related to one or more defined geographic areas; and
a display,
wherein the caller ID control module is configured to:
determine, for an incoming call, whether a call signal associated with the incoming call includes caller ID data,
determine, when the call signal associated with the incoming call includes caller ID data, whether the memory includes caller ID restriction settings data for the determined location, and
output, to the display, caller ID restriction information relating to the incoming call,
wherein the caller ID restriction information does not include an entirety of the caller ID data included in the call signal associated with the incoming call.

2. The mobile device according to claim 1, further comprising a transceiver configured to receive one or more caller ID restriction settings from a remote location.

3. The mobile device according to claim 1, wherein a defined caller ID restriction setting is based upon a radial distance from a predetermined geographic position.

4. The mobile device according to claim 1, wherein the caller ID restriction information output to the display does not include photo or description information included in the caller ID data.

5. The mobile device according to claim 1, wherein the caller ID restriction information output to the display includes information that indicates restrictions placed on the caller ID data.

6. A method comprising:
identifying a caller ID function restriction of a mobile communication device;
specifying a geographic location at which the caller ID function restriction is imposed;
storing the specified geographic location in a memory of the mobile communication device;
determining that the location of the mobile device is within the specified location; and
applying the caller ID function restriction to a call in which the mobile device is engaged in response to the determining step,
wherein applying the caller ID function restriction to the call operates to prevent inclusion of an entirety of available caller ID data in the call.

7. A method as recited in claim 6, wherein the caller ID function restriction comprises blocking at least some of the available caller ID data.

8. A method as recited in claim 6, wherein the step of identifying comprises receiving a restriction setting from a remote location.

9. A method as recited in claim 6, wherein the step of identifying comprises defining by the device user a plurality of geographic areas with which respective caller ID functions restrictions are associated.

10. A method as recited in claim 6, wherein the step of specifying comprises defining a radial distance from a predetermined geographic location.

11. A method as recited in claim 6, further comprising displaying the caller ID function restriction on the mobile communication device.

12. A method as recited in claim 11, wherein the step of displaying comprises providing an option for the user to override the caller ID function restriction.

13. A method as recited in claim 6, wherein the step of identifying comprises limiting the caller ID function restriction to incoming calls.

14. A method as recited in claim 6, wherein the step of identifying comprises limiting the restriction to outgoing calls.

15. A method as recited in claim 6, wherein applying the caller ID function restriction to the call operates to block inclusion of a photo or description in transmitted or displayed caller ID data.

* * * * *